United States Patent
Park et al.

(10) Patent No.: US 11,853,402 B2
(45) Date of Patent: Dec. 26, 2023

(54) VIDEO RESOLUTION ENFORCEMENT AND OPTIMIZATION IN AN ADAPTIVE BITRATE ENVIRONMENT

(71) Applicant: Comcast Cable Communications, LLC, Philadelphia, PA (US)

(72) Inventors: Kyong Park, Haverford, PA (US); James W. Fahrny, Parker, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 1012 days.

(21) Appl. No.: 14/491,393

(22) Filed: Sep. 19, 2014

(65) Prior Publication Data

US 2016/0088048 A1   Mar. 24, 2016

(51) Int. Cl.
| | |
|---|---|
| *G06F 21/10* | (2013.01) |
| *H04N 21/254* | (2011.01) |
| *H04N 21/2343* | (2011.01) |
| *H04N 21/4627* | (2011.01) |
| *H04L 65/75* | (2022.01) |
| *H04N 19/127* | (2014.01) |
| *H04N 19/154* | (2014.01) |
| *H04N 19/187* | (2014.01) |
| *H04N 19/192* | (2014.01) |

(52) U.S. Cl.
CPC ............ *G06F 21/10* (2013.01); *H04L 65/762* (2022.05); *H04N 19/127* (2014.11); *H04N 19/154* (2014.11); *H04N 19/187* (2014.11); *H04N 19/192* (2014.11); *H04N 21/23439* (2013.01); *H04N 21/2541* (2013.01); *H04N 21/4627* (2013.01); *G06F 2221/0744* (2013.01); *G06Q 2220/16* (2013.01)

(58) Field of Classification Search
CPC ...... G06Q 20/00–425; G06F 21/00–88; H04N 19/00–99; H04N 21/00–8586; H04L 65/00–80
See application file for complete search history.

(56) References Cited

U.S. PATENT DOCUMENTS

| | | | |
|---|---|---|---|
| 8,813,117 B1 | 8/2014 | Inskip, VI et al. | |
| 9,326,012 B1* | 4/2016 | Dorwin | H04N 21/4405 |
| 2007/0204064 A1 | 8/2007 | Mail et al. | |

(Continued)

FOREIGN PATENT DOCUMENTS

| | | |
|---|---|---|
| EP | 2211546 A1 | 7/2010 |
| EP | 2615777 A1 | 7/2013 |
| WO | 2014/059047 A2 | 4/2014 |

OTHER PUBLICATIONS

Ron White, How Computers Work, Oct. 15, 2003, Que Publishing, 7th Ed, p. 4. (Year: 2003).*

(Continued)

*Primary Examiner* — Mohammad A. Nilforoush
(74) *Attorney, Agent, or Firm* — Banner & Witcoff, Ltd.

(57) ABSTRACT

Methods and systems related to authoring and acquiring digital rights management (DRM) licenses are disclosed. For example, a computing device may generate or author a digital rights management license for a content asset that includes one or more usage restriction rules. A usage restriction may limit the maximum display resolution for a content asset. Another device may then receive the license and process the one or more usage restrictions prior to presentation of the content asset to a user.

20 Claims, 7 Drawing Sheets

(56) References Cited

U.S. PATENT DOCUMENTS

| | | | |
|---|---|---|---|
| 2007/0204311 A1 | 8/2007 | Hasek et al. | |
| 2008/0294890 A1 | 11/2008 | Lee et al. | |
| 2009/0086975 A1 | 4/2009 | Robert et al. | |
| 2011/0032856 A1* | 2/2011 | Ozawa | H04L 12/6418 370/310 |
| 2011/0058675 A1* | 3/2011 | Brueck | H04N 21/2541 380/277 |
| 2013/0254815 A1* | 9/2013 | Pfeffer | H04N 21/25891 725/96 |
| 2014/0165116 A1 | 6/2014 | Major et al. | |

OTHER PUBLICATIONS

Dec. 16, 2015—Extended European Search Report—EP app 15185793.5.
Feb. 12, 2018—European Office Action—EP 15185793.5.
Sep. 26, 2018—European Summons to Oral Proceedings—EP 15185793.5.
Sep. 10, 2019—European Summons to Oral Proceedings—EP 15185793.5.
Aug. 26, 2021—Canadian Office Action—CA 2,901,185.
Jun. 13, 2022—Canadian Office Action—CA 2,901, 185.

* cited by examiner

VIDEO RESOLUTION ENFORCEMENT AND OPTIMIZATION IN AN ADAPTIVE BITRATE ENVIRONMENT

BACKGROUND

Content owners rely on device output protection capabilities as an integral component to anti-piracy strategies. Yet the current consumer electronic landscape reflects a reality where broad implementation support for such output protection mechanisms, such as verifiable high-bandwidth digital content protection (HDCP) authentication, is unreliable. The lack of a general output protection solution drives content owners to mitigate losses by reducing the quality, and therefore, the value of content delivered to such devices.

Additionally, video content may be transmitted over links with unknown or variable bandwidth characteristics. To accommodate the different bandwidths that may be available, the video content may be offered in several formats, each with different bandwidth requirements. If the quality of a communication link degrades during delivery such that the selected format is no longer supported, a server may stop transmitting the selected format and select a format with lower-bandwidth requirements for transmission. Varying the format of a video stream over time is known as adaptive streaming.

SUMMARY

This summary is not intended to identify critical or essential features of the disclosures herein, but instead merely summarizes certain features and variations thereof. Other details and features will also be described in the sections that follow.

Some aspects of the disclosure relate to methods and systems that may facilitate adaptive streaming in an environment where restrictions on content presentation are desired. Content adapted for streaming may be available to a device in several different versions. Each of the different versions may correspond to different characteristics, such as resolution, bit rate, or a combination thereof. In some embodiments, a usage restriction rule may be present. A usage restriction rule defines properties such as a maximum resolution and/or bit rate for a content asset. Therefore, although multiple versions of a content asset may exist, a usage restriction rule or set of usage restriction rules may limit the device, such as a mobile terminal or set-top box, to choose from only a subset of the multiple versions. As an example, the device may be limited to choosing only certain versions because the device is incompatible with other versions of the content asset. As another example, the device may be so limited because the device is configured in such a way that piracy of high-definition content is a concern.

In one aspect, a computing device such as a server may determine at least one usage restriction for content. The computing device may then author a digital rights management (DRM) license that comprises the at least one usage restriction, and may then transmit the DRM license to a receiving device.

In another aspect, a client device may receive a DRM license containing at least one usage restriction and a media decryption key. The DRM license may be applicable to a plurality of content versions. The at least one usage restriction may be processed. Based on the processing of the at least one usage restriction, at least one content version present in a plurality of content versions may be consumed.

In some aspects, a media decryption key for the content may be generated, which may be also included in the DRM license. Access to one or more of the different content versions may be gated based on successful deciphering of a common media decryption key. This decryption key is to be deciphered after a set of usage restrictions has been analyzed.

In some aspects, the plurality of content versions may include a first content version and a second content version. The first content version and the second content version may be each configured to present data representative of the same content. However, the first content version may be configured to present the content in a higher resolution than the second content version. For example, the first content version may present the data in a high-definition resolution, and the second content version may present the data in a standard-definition resolution.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
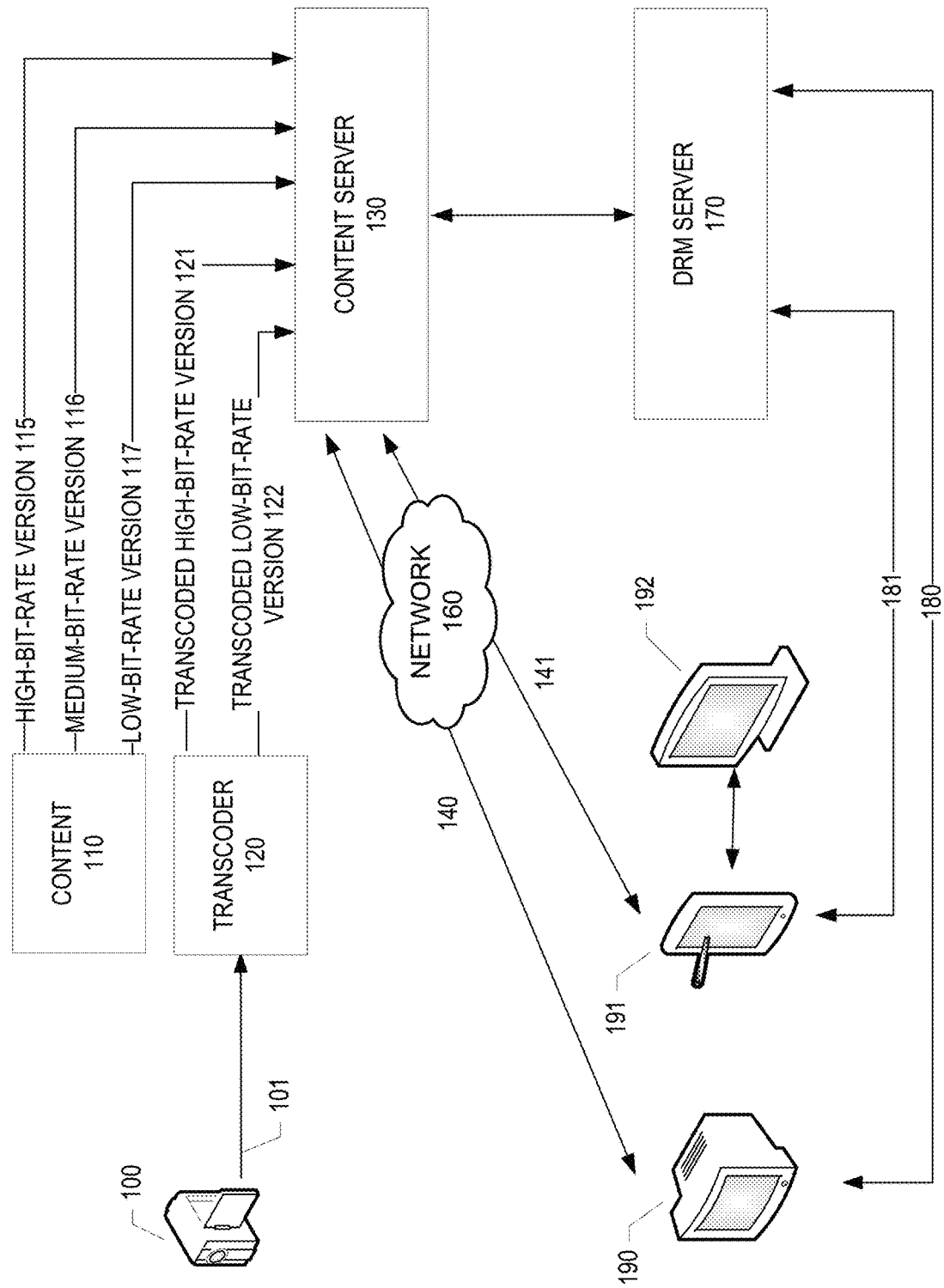
FIG. 1 illustrates an example system for providing multiple data streams for a content asset.

FIG. 1 illustrates an example of a system configurable for adaptive bitrate streaming. A content server 130 may be configured to provide streaming content. The content server 130 may be configured to provide content from a live source, such as a video camera 100. This content may already be encapsulated in a data stream or set of data streams, and may have been encoded from a single stream 101 into multiple streams 121 and 122 by transcoder 120. The streams 121 and 122 may differ in the number of bits per second transmitted.

The content server 130 may be configured to access content such as content asset 110 stored locally to the content server, or access content stored remotely, such as on a data storage device (not shown). The content asset 110 may be video content, audio content, data content, or any other type of content. The content asset 110 may include media on demand content, video on demand content, streaming video, internet protocol video, television programs, text listings, graphics, advertisements, and other content. The content asset 110 may represent an individual piece of content, such as a particular movie, television episode, online video clip, image, or any other data.

The content server 130 may be configured to access multiple versions of the content asset 110. These multiple versions may be differentiated based on, for example, their display format, display resolution, audio track, spoken language, presence of objectionable content, presence of advertising, and other like characteristics. For example, the content asset 110 may be a video content and there may be three versions of the content asset 110: a high-resolution version, a medium-resolution version, and a low-resolution version. As one example, the high-resolution version may have a high-definition 1080P resolution (e.g., 1920×1080) or higher resolution; the medium-resolution version may have a high-definition 720P resolution (e.g., 1280×720); or the low resolution version may have a standard-definition 480i resolution (e.g., 640×480). Other content assets may have zero, one, two, three, or more than three versions accessible to the content server 130.

Multiple versions differentiated by their video resolution may be encoded at different bit rates. In other words, each of the versions may be encoded such as to compress content asset 110 by a different amount. Therefore, for the content asset 110, the high-resolution version may be encoded into a high-bit-rate content version 115, the medium resolution version may be encoded into a medium-bit-rate content version 116, and the low resolution version may be encoded into a low-bit-rate content version 117. For example, the high-bit-rate content version 115 may be encoded at an average bit rate of above 5 megabits per second (Mbps); the medium-bit-rate content version 116 may be encoded at an average bit rate between 0.5 Mbps and 5 Mbps; and the low-bit-rate content version 117 may be encoded at an average bit rate below 0.5 Mbps.

Content assets and/or versions of content may be stored at the content server 130 and/or may be accessible to the content server 130 while stored elsewhere. Some versions of the content asset 110 may be stored or cached at the content server 130 while others are stored remotely from the content server 130. Storage at the content server 130 of only some versions of the content asset 110 may be based on the popularity of the stored versions or other criteria of either the content versions and/or the environment, which may help to reduce latency. For example, where content versions differ based on the spoken language used in the content, one content version (e.g., where the spoken language is English) may be more popular than a second content version (e.g., where the spoken language is German). As another example where the content versions differ based on their display resolution, the content server 130 may store locally the high-bit-rate and low-bit-rate content versions 115 and 117, but not the medium-bit-rate content version 116. Not storing medium-bit-rate content version 116 may be because network statistics indicate conditions favorable for delivery of medium-bit-rate content version 116 are not frequently present.

In some embodiments, the content server 130 may be configurable to generate new versions based on at least one version of the content available to the content server. For example, if no lower-definition and/or lower-resolution version of the content asset 110 is present or available to the content server 130, and the content server 130 has access to a higher-definition and/or higher-resolution version of the content asset 110, the content server 130 may cause the generation of a lower-definition and/or lower-resolution version of content 110 to be stored locally or remotely and/or immediately transmitted, such as to a client device.

A content asset (and/or some or all of the stored or generated versions of the content asset) may be fragmented into segments. For example, if the content asset 110 is a video content, there may be a plurality of video fragments for each of the content versions 115, 116 and/or 117, each segment being of a specified or variable length. The segments may be separately addressed and retrieved. Accessing a version of the content asset 110 in its entirety may be performed by accessing the stored or accessed content segments for the version, either sequentially, or in a random order for later sorting.

Also present in the adaptive streaming environment of FIG. 1 is a DRM server 170. The DRM server 170 may be configured to implement one or more various DRM protection methods or schemes to protect the content asset 110 and/or the versions thereof. Where content assets and/or content versions have been segmented, the segments may also be protected using the one or more various DRM protection methods and schemes. In some embodiments, where one DRM protection method used by the DRM server 170 is encryption, the DRM server 170 or the content server 130 may encrypt each version of the content asset 110 using a common encryption key. The DRM server 170 may also be configured to issue usage restriction rules, which serve to limit the modes of consumption of content such as the content asset 110. Usage restriction rules will be discussed further in conjunction with FIG. 4.

In some embodiments, the DRM server 170 may act as a gateway to the content server 130. Communication from and/or to downstream client devices, such as client devices 190 and 191, may be channeled through the DRM server 170. For example, this may be done for initialization and authentication purposes, or may be done to ensure that the client devices 190 and 191 have continuing valid permissions to communicate with the content server and receive data from the content server. In some embodiments, the content server 130 and the client devices 190 and 191 may communicate directly using a connection such as data streams 180 and 181, potentially reducing the latency of the network communication. The content server 130 and/or the client devices 190 and 191 may occasionally communicate with the DRM server 170 in such embodiments to ensure the client devices 190 and 191 have appropriate permissions to access and receive content.

In some embodiments, the DRM server 170 and/or the content server 130 may receive a request to initiate content streaming from a computing device, such as from one of the client devices 190 and 191 (described below with respect to FIGS. 2 and 3). For example, the content server 130 may receive a request from a client device 190 for the content asset 110. In response, the content server 130 may access one or more of the content versions 115, 116, and 117, which may be stored in memory, and initiate transmission of one or more of the content versions 115, 116, and 117. In some embodiments, this transmission may include transmitting segments from one or more of the content versions 115, 116, and 117. In some embodiments, the content server may generate transmittable data for the client device 190 using data from one or more of the content versions 115, 116, and 117 (or the segments thereof), and/or other data stored at the content server. Once one or more of the content versions 115, 116, and 117, or portions thereof, have been generated or selected for transmission, the content server 130 and/or the DRM server 170 may transmit the data via either or both of the connections 140 and 180 to the client device 190.

The client devices 190 and 191 may include or comprise a DRM client with hardware and/or software components or subcomponents configurable to request, receive, and/or validate DRM-related information, including information obtainable from the DRM server 170. The devices 190 and 191 may connect over one or more network and/or subnetworks, such as a network 160, to either or both of the content server 130 and the DRM server 170. In some embodiments, the client device 190 may be a gateway, set-top box, internet-enabled television, laptop computer, desktop computer, or wired and/or wireless communication terminal. In other embodiments, the client device 191 may be a mobile phone, smart phone, tablet, or other mobile terminal. As shown in FIG. 1, the client devices 190 and/or 191 may be configurable to communicate with and/or deliver content to an optional external monitor 192.

Figure 2A:
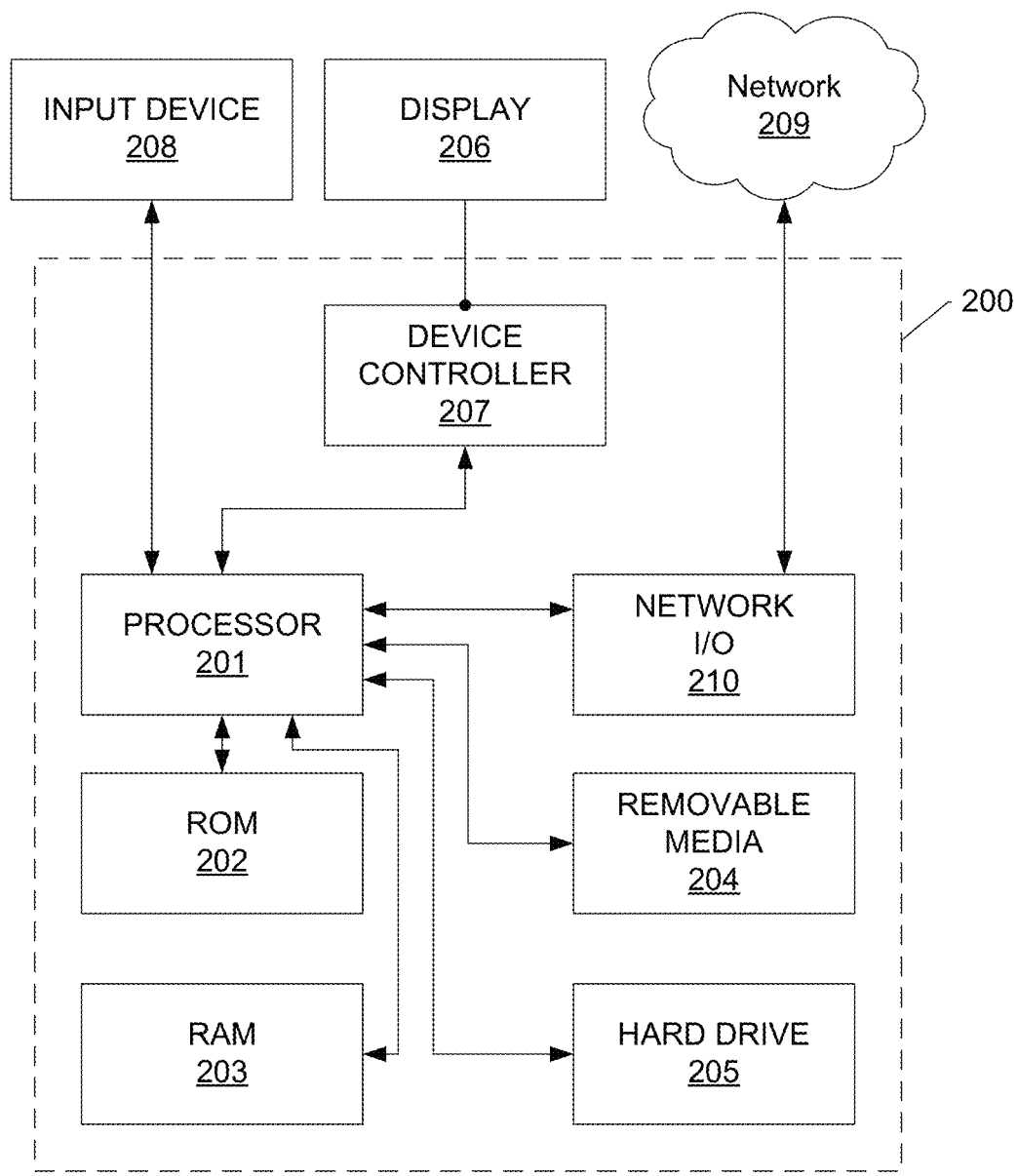
FIGS. 2A-2B illustrate example software and hardware devices on which various elements described herein can be implemented

FIG. 2A illustrates general hardware elements and software elements that can be used to implement any of the various computing devices and/or software discussed herein, including those of adaptive streaming environment 100. Device 200 may include one or more processors 201, which may execute instructions of a computer program to perform any of the functions and steps described herein. The instructions may be stored in any type of non-transitory computer-readable medium or memory to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), hard drive, floppy disk drive, or any other desired electronic storage medium. Instructions may also be stored in hard drive 205, which may be an internal or external hard drive.

The device 200 may include one or more output devices, such as a display 206 (e.g., an external monitor or television), and may include one or more output device controllers 207, such as a video processor. In some embodiments, the device 200 may include one or more user input devices 208, such as a remote control, keyboard, mouse, touch screen, microphone, or any other input device.

The device 200 may also include one or more network interfaces, such as network input/output (I/O) interface 210 to communicate with one or more external networks 209. One or more external networks 209 may include, for example, one or more telecommunications networks, Internet Protocol networks, cellular communications networks (e.g., Global System for Mobile Communications (GSM), Code Division Multiple Access (CDMA), and any other 2nd, 3rd, 4th and higher generation cellular communications networks), cellular broadband networks, radio access networks, fiber-optic networks, local wireless networks (e.g., Wi-Fi, WiMAX), satellite networks, and any other networks or combinations of networks. The network interface may be a wired interface, wireless interface, or a combination of the two. In some embodiments, network I/O interface 210 may include a cable modem, and the network 209 may include the communication links 301 shown in FIG. 3, one or more external networks 209, an in-home network, a provider's wireless, coaxial, fiber, or hybrid fiber/coaxial distribution system (e.g., a DOCSIS network), or any other desired network.

Figure 2B:
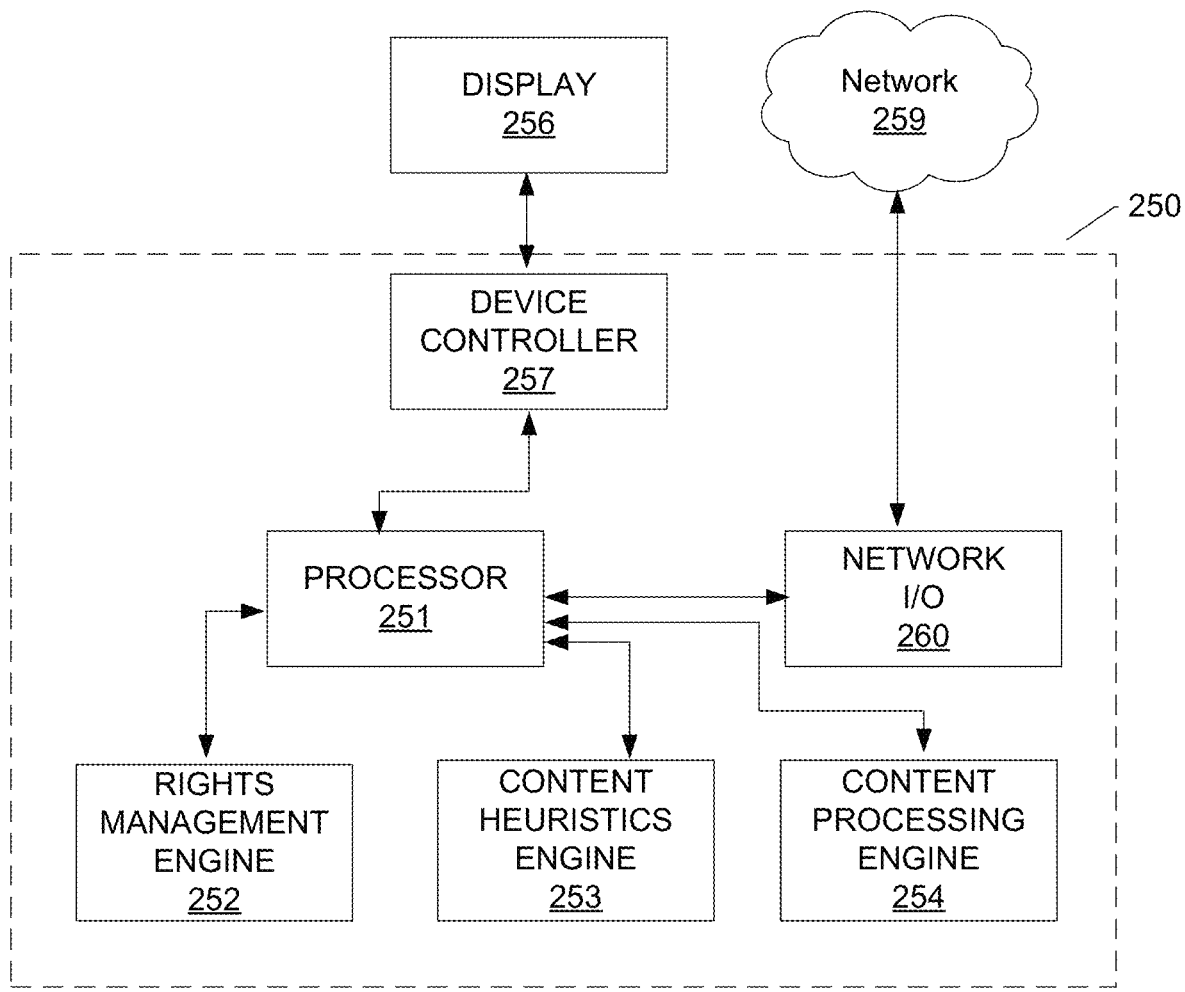

FIG. 2B further illustrates hardware elements and software elements that may be used to implement any of the various computing devices and/or software discussed herein, including those of adaptive streaming environment 100. In some embodiments, the various hardware and software elements of a device 250, as illustrated in FIG. 2B, may be implemented, in either hardware and/or software, in, among, or by the various hardware and software elements of the device 200. In other embodiments, the device 250 may implement the various hardware and software elements of the device 200, as illustrated in FIG. 2A.

The device 250 may include one or more processors 251, which may execute instructions of a computer program to perform any of the functions and steps described herein. The instructions may be stored in any type of non-transitory computer-readable medium or memory to configure the operation of the processor 251, including media and/or memory similar to those discussed above with regard to FIG. 2A (not shown in FIG. 2B). The device 250 may include one or more processing components and/or subcomponents such as rights management engine 252, video heuristics engine 253 and/or content processing engine 254, one or more of which may be implemented in software, hardware, and/or firmware.

The rights management engine 252 may be configurable to request, receive, and/or validate rights and other rights management information, including DRM-related information. In some arrangements, this information may information obtainable from a DRM server, such as the DRM server 170. The content heuristics engine 253 may be configurable to enable the device 250 to select from one or more of a number of content versions receivable by the device, including for example content versions 115, 116, and 117, and/or the segments thereof. The content heuristics engine 253 may use available data regarding device and/or network conditions to determine which one or more content versions and/or segments to select for delivery to the device 250. This available data may include, for example, capacity and usage information regarding the processor 251, latency of network 259, size and/or content of previously received content versions and/or segments, available free space available on a storage media and/or memory, and the like.

For example, in some arrangements where the client device 190 and/or the client device 191 may implement the hardware elements and software elements of the device 250, the determination of the content heuristics module 253 may depend on the network latency between the client device(s) 190 and/or 191, and the DRM server 170 and/or the content server 130. For example, when a low amount of network latency is present, the content heuristics engine may select a segment from high-bit-rate content version 115, which may have a higher display resolution. Additionally or alternatively, if significant amounts of network latency are present, the content heuristics engine 253 may select a first segment from low-bit-rate content version 117 or medium-bit-rate content version 116, which may have lower display resolutions when compared with the high-bit-rate content version 115. However, if network conditions improve and the network latency is reduced, the content heuristics engine 253 may select for a later segment a segment from high-bit-rate content version 115.

The content processing engine 254 may contain various components and/or subcomponents for performing intermediate processing between delivery of data to the device 250 (via network 259 and/or device I/O 260) and presentation of the data at, for example, display 260. For example, if the data to be presented is video or image data, the content processing engine 254 may include noise reduction components, color space conversion components, frame rate conversion components, sampling/resampling components, video compression/decompression components, and the like. The content processing engine 254 may be configurable to decrypt encrypted delivered content versions and/or the segments thereof. Decryption may be responsive to successful receipt and/or validation of rights management information by the rights management engine 252.

The device 250 may include one or more output devices, such as a display 256 (e.g., an external monitor or television), and may include one or more output device controllers 257, such as a video processor. The device 250 may also include one or more network interfaces, such as a network input/output (I/O) interface 260 to communicate with one or more external networks 259. The one or more external networks 259 may include the same or similar networks discussed above with regard to the one or more external networks 209 of FIG. 2A.

Figure 3:
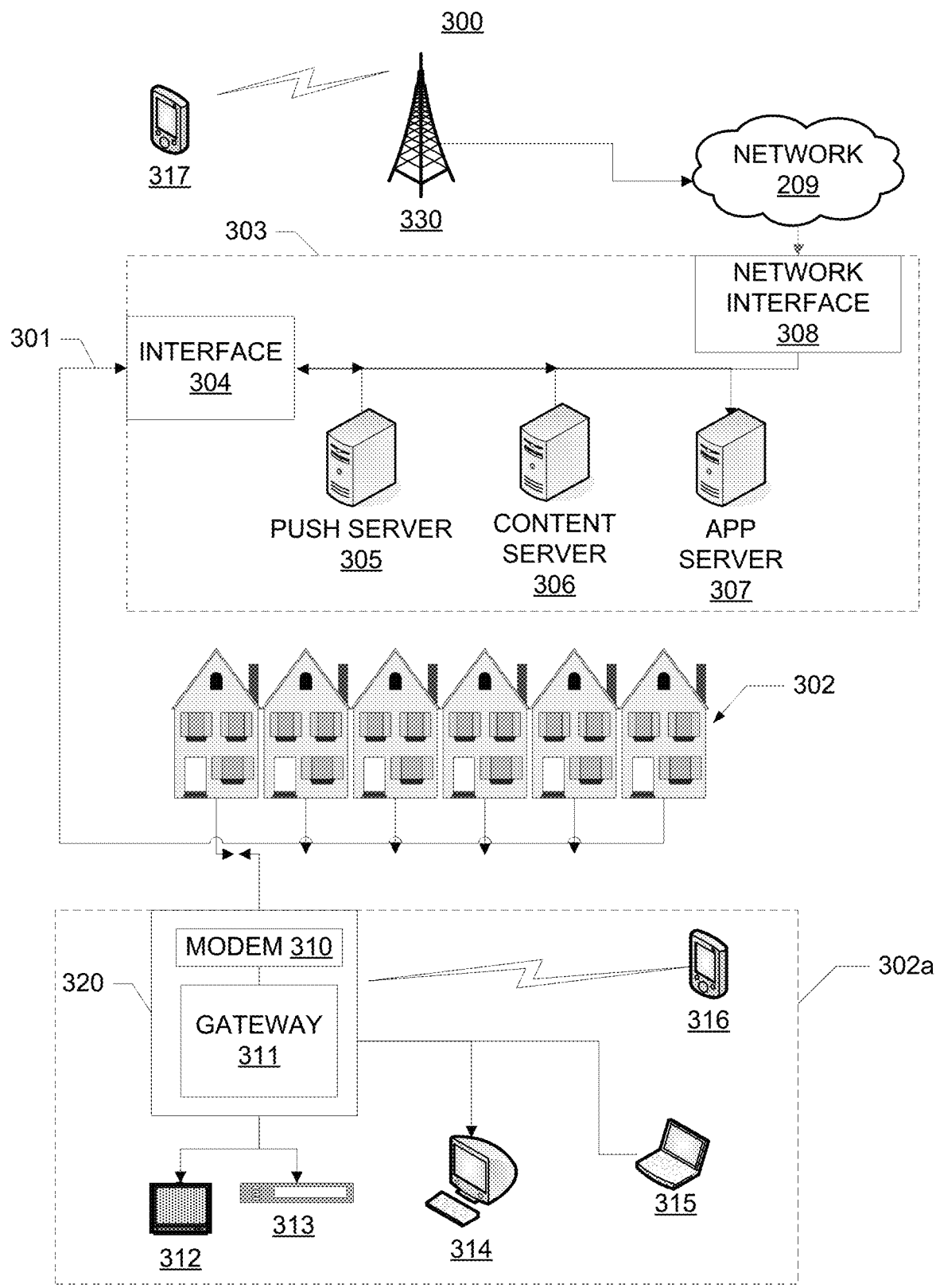
FIG. 3 illustrates an example network environment.

FIG. 3 illustrates an example information distribution network 300 in which many of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

The network 300 may comprise a telecommunications network, a multi-service operator (MSO) network, a cable television (CATV) network, a cellular network, a wireless network, an optical fiber network, a coaxial cable network, a hybrid fiber-coaxial (HFC) network, or any other type of information distribution network or combination of networks. For example, the network 300 may comprise a cellular broadband network communicating with multiple communication access points, such as a wireless communication tower 330, to provide communication signals to devices such as a wireless device 317 (e.g., a mobile phone, a wireless laptop, a tablet computer, a portable gaming device). In another example, the network 300 may be a coaxial system comprising a modem termination system (e.g., a cable mode termination system (CMTS)) communicating with numerous gateways and/or gateway interface devices (e.g., gateway 311 in example home 302a). The network 300 may use a series of interconnected communication links 301 (e.g., coaxial cables, optical fibers, wireless links, etc.) to connect premises such as homes 302 or other user environments to a local office 303.

The local office 303 may include an interface 304, which may be a computing device configured to manage communications between devices on the network of communication links 301 and backend devices, such as server 305, server 306, and server 307. The local office 303 may include one or more network interfaces 308 for communicating with one or more external networks 209.

The local office 303 may include a variety of servers that may be configured to perform various functions. The local office 303 may include one or more push servers 305 for generating push notifications to deliver data to devices that are configured to detect such notifications. The local office 303 may include one or more content servers 306, which may implement the elements of the content server 130. The one or more content servers 306 may be configured to provide content (e.g., content versions 115, 116, 117, 121, 122) to devices. The local office 303 may include one or more application servers 307, which may be used, in some instances, to implement the transcoder 120 and/or the DRM server 170. In other embodiments, the local office 303 may be communicatively coupled to transcoder 120 and/or the DRM server 170 through one or more external networks 209.

Homes 302 such as home 302a may include an interface 320, which may include a device 310, for communicating on communication links 301 with the local office 303, one or more external networks 209, or both. In certain implementations, the device 310 may be a part of, or communicatively coupled to, a gateway 311, which may be a gateway interface device (e.g., a wireless router, a set-top box, a computer server).

The gateway 311 may include local network interfaces to provide communication signals to client devices in or near example home 302a, such as television 312, set-top box 313, personal computer 314, laptop computer 315, wireless device 316 (e.g., a wireless laptop, a tablet computer, a mobile phone, a portable gaming device), a vehicular computing system (e.g., a mobile computing system, navigation system, or entertainment system in an automobile, marine vessel, or aircraft) and any other device.

Figure 4B:
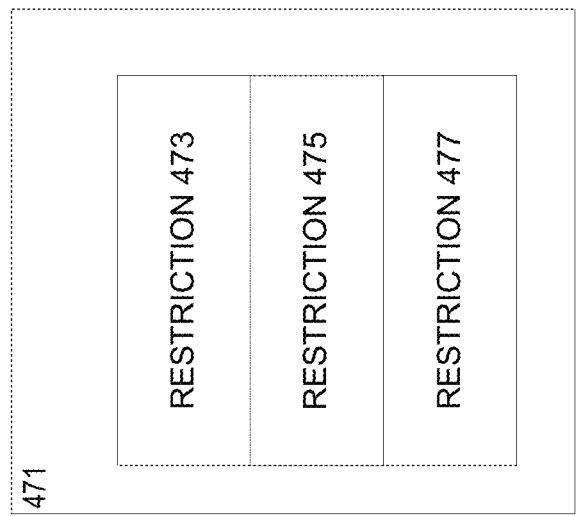
FIGS. 4A-4B illustrate an example set of usage restrictions, the contents thereof, and ordering of the various usage restrictions.
Figure 4B:
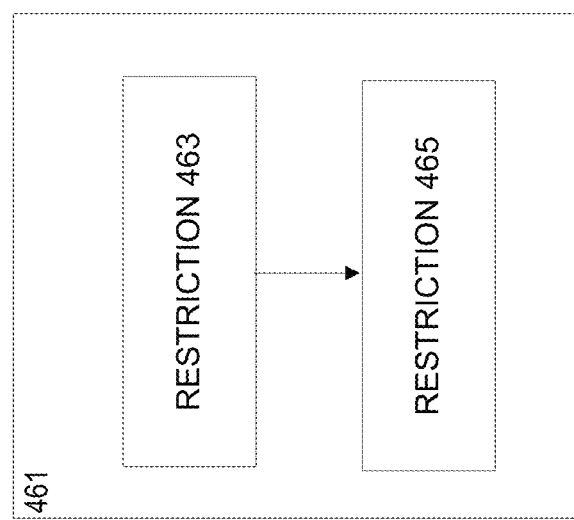
Figure 4B:
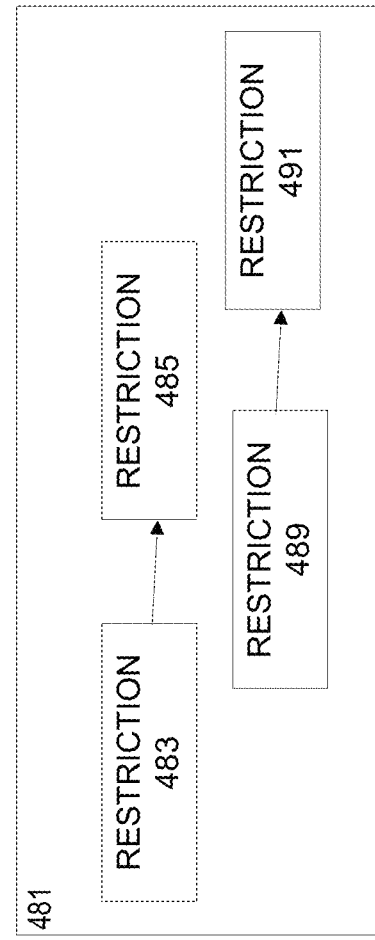
Figure 4A:
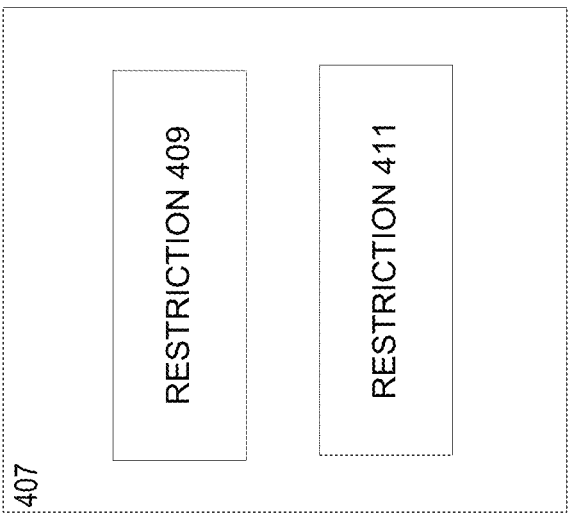

FIGS. 4A and 4B illustrate example data structures that may be used in conjunction with any of the various embodiments discussed herein. FIG. 4A illustrates an example set of usage restriction rules 407, including a video resolution rule 409. In some embodiments, owners and/or distributors of content may contract with a content provider to enable the content provider's customers to consume the owned or distributed content. This content may be distributed to the content provider's customers using the environments and networks depicted in FIGS. 1-3. As part of the negotiated agreement, these owners and/or distributors may seek assurances that the content provider distributes the content to its consumers with restrictions on how, when, and where the content is to be enjoyed. Alternatively, the content provider may have a default set of restrictions as part of its anti-piracy offerings. Regardless of whether the source of the usage restriction is the content owner, content distributor, content provider, or some other source, the content provider may be tasked with issuing these usage restriction rules as part of providing content to its consumers.

One example of a content restriction may be a maximum number of devices on which the content can be concurrently displayed or otherwise consumed. Another example of a content restriction may be a time window in which the content is to be consumed. Yet another example of a content restriction may be setting a maximum video resolution. This type of content restriction may be issued as a video resolution rule.

Usage restriction rules, including video resolution rules may be defined unconditionally, such that the rule may apply to any device on which the content is to be consumed. Additionally or alternatively, usage restriction rules may be defined conditionally and may be applicable to a device based in part on the capabilities and/or state of the consumption device. For example, using the environment of FIG. 1 for reference, the client device 191 may be only capable of displaying a video content in a standard definition format (e.g., client device 191 may have a non-high-definition display). Therefore, delivering the content in a high definition may be unnecessary and potentially an inefficient allocation of resources. If a set of usage restrictions is prepared for the client device 191 in conjunction with its consumption of the content asset 110 (a content asset which may be available in a high-definition content version), the set of content restrictions may therefore include a video resolution rule in which the maximum video resolution may be set to an resolution lower than high-definition.

Additionally or alternatively, the video resolution rule may be calculated according to a device state. For example, the client device 191 may have an optional external monitor 192 attached and activated to display video content from the client device 191. License agreements or restrictions established for the content asset 110 may prohibit high definition display of the content asset 110 on an external monitor. While the external monitor is attached to client device 191, the content server 130 may provide to client device 191 only a standard-definition version of content 110 (e.g., low-bitrate content version 117), because of the presence of the attached external monitor 192. A usage restriction rule may look to the capabilities of the devices in the environment. For example, the content owner, distributor and/or provider may allow for high-definition versions of content asset 110 to be displayed on the optional external monitor 192, but only if optional external monitor 192 utilizes a digital video connection and a content-protection scheme such as High-Bandwidth Digital Content Protection (HDCP).

In addition to business inputs and/or contractual agreements, usage restriction rules, including video resolution rules, may also be the result of consumer preferences. For example, a consumer may express a preference that, rather than watching a lower-resolution version, they would rather have the device increase the amount of high-definition content initially buffered, even though this may delay the start of the content. This preference may be expressed directly via device settings, inferred through content selection (e.g., selecting a high-definition version of content from a menu of content offerings) or learned through customer metrics or behavior (e.g., the user turns off the device and/or content when the content resolution switches from a higher-resolution version to a lower-resolution version.)

In some embodiments, because of the ways in which digital content may be distributed, the digital content may be downloaded or a license to view the content may be acquired at an earlier point in time then the content will be consumed via playback. In the interim, the state of the client device 191 and/or the consumption environment may change. For example, a user may select a digital content to stream and acquire a license to the content from the DRM server 170 and then, prior to playback, attach an external monitor such as external monitor 192. As the consumption environment may change, usage restrictions are capable of being evaluated immediately prior to playback and content consumption.

The set of usage restriction rules 407 may contain multiple video resolution rules 409 and 411. Usage restriction rules may be organized as either an unordered set and/or subset from which the client device 191 and/or 191 may select any rule in the unordered set or subset. Alternatively, the usage restrictions may be processed in a prioritized series as an ordered set or subset, or they may be placed into an ordered and directed graph to be processed through a traversal of the graph. As an example, the set of usage restrictions may contain a subset for set-top boxes and a second subset for mobile devices. The subset for mobile devices may further contain a video resolution rule for a tablet-sized device and a video resolution rule for a smartphone-sized device. These rules may be presented as an unordered set of video resolution rules. As another example, the subset containing usage restrictions for the set-top box may contain a video resolution rule that determines the user of the set-top box is a valid subscriber to an optional high-definition offering. The same subset may contain a video resolution rule that enables content to be consumed only on digital external display monitors. These rules may be processed as an ordered set, as if the user is not a high-definition subscriber, the content should not be delivered in high-definition, regardless of the device state. However, if the user is a subscriber, further analysis of the content consumption environment is necessary to determine if the capabilities of the devices attached to the set-top box are adequate for high-definition content consumption.

FIG. 4B illustrates some of the various ways in which video resolution rules may be ordered, if desired. For example, set 461 is an ordered set. Usage restriction rule 463 is to be processed before usage restriction rule 465. Set 471, in contrast is an unordered set. At the appropriate time for processing the usage restriction rule set 471, device 190 may select any of the usage restriction rules in set 471, including for example usage restriction rules 473, 475 and 477.

Set 481 depicts one possible way that the usage restriction rules may be ordered in a directed graph. In this set, usage restriction rule 483 is to be processed before usage restriction rule 485, but the ordered processing of rule 483 and rule 485 need not be consecutive. For example, usage restriction rule 489 may be processed either prior to rule 483, between rule 483 and rule 485, or after rule 485. Usage restriction 491 may be processed after usage restriction 489 but, so long as that condition is met, may also be processed either before usage restriction rule 483, between rule 483 and rule 485, or after rule 485. Of course, more complicated graphs and graph traversals are consistent with the various arrangements and embodiments discussed herein.

Figure 5:
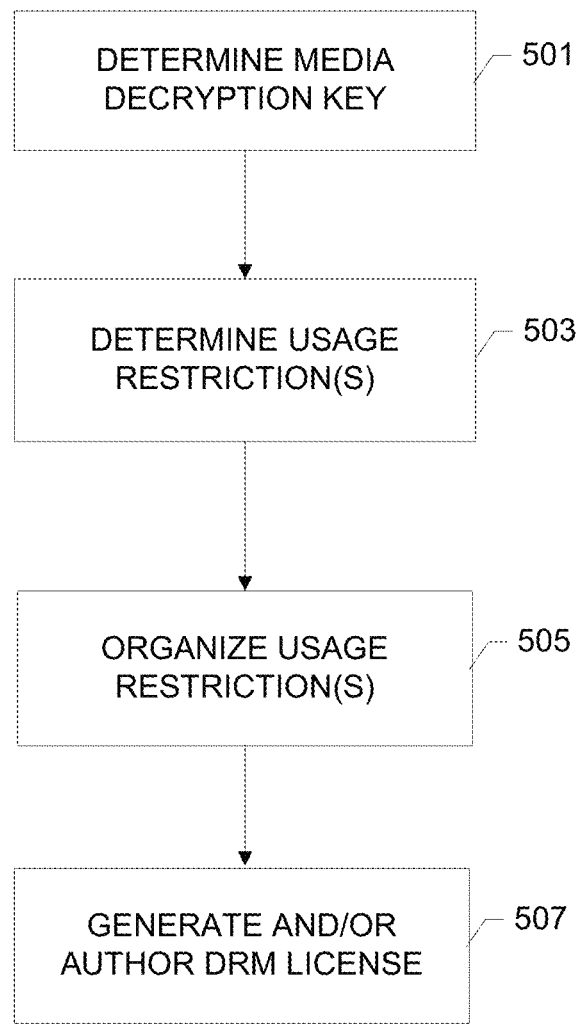
FIG. 5 illustrates an example process flow for generating a DRM license.

FIG. 5 illustrates an exemplary process by which the DRM server authors the DRM license. In step 501, the DRM server may determine a media decryption key. As discussed above, this decryption key may be used ultimately by a device, such as client device 190, to decrypt one or more of the various content versions 115, 116, and 117, or the segments thereof. The same decryption key may be used among the various content versions. In step 503, the DRM server may determine usage restrictions. These usage restrictions may include video resolution rules. As discussed above, a video resolution rule may provide device 190 a maximum resolution in which to present the content 110. For example, the maximum resolution may be a standard definition resolution, such as 480P or the maximum resolution may be a high definition resolution such as 1080P. This video resolution may be set unconditionally to absolute values, or this video resolution may be set according to the device capabilities and/or the device state. In step 505, the DRM server may organize the usage restrictions into a set of usage restrictions to be processed by the client device 190 prior to playback. In step 507, the DRM server may generate or author the DRM license such that the set of usage restrictions is to be processed prior to client device 190 processing the decryption key.

Figure 6:
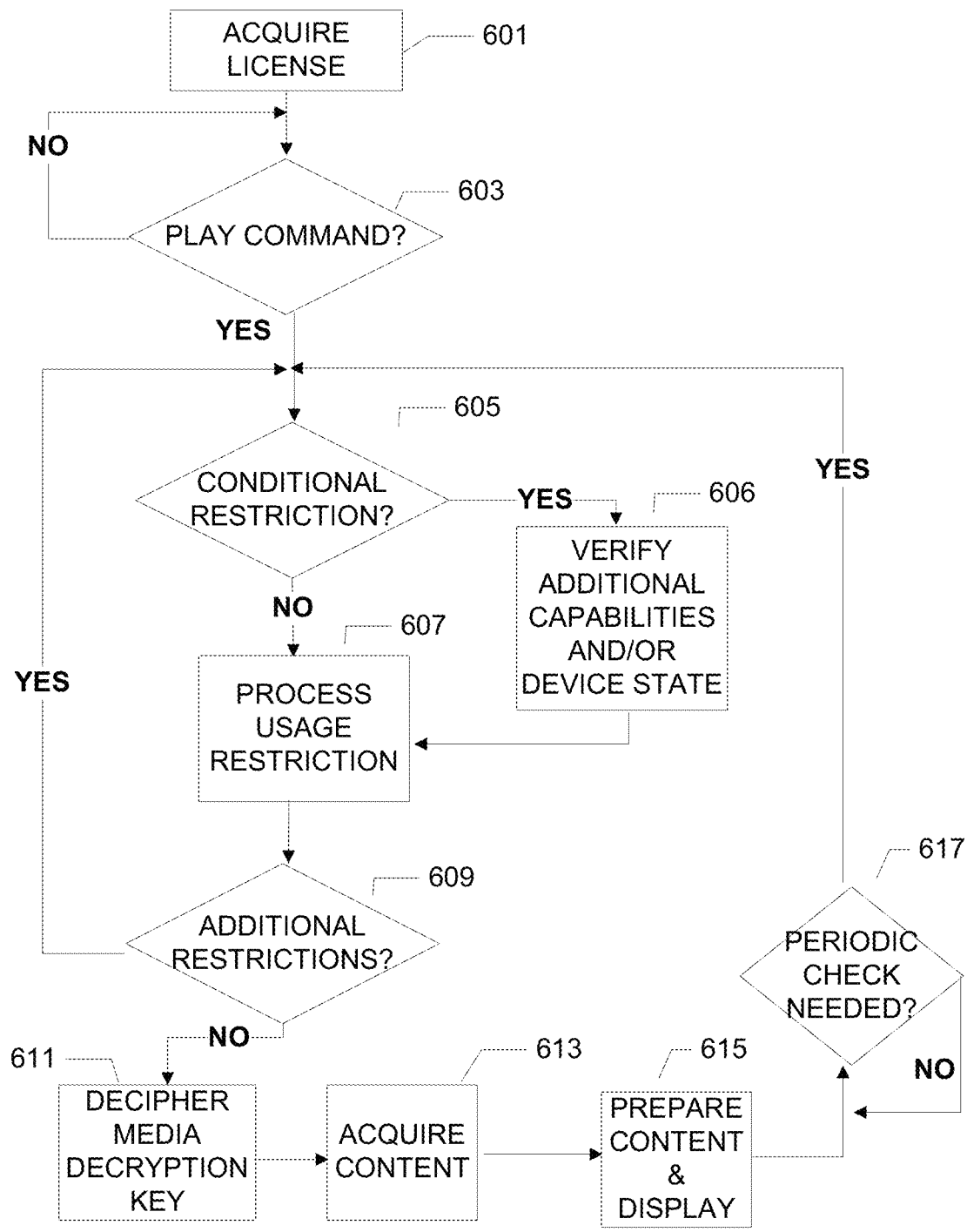
FIG. 6 illustrates an example process flow for acquiring and processing a DRM license.

FIG. 6 illustrates the process by which the client device acquires the DRM license and obtains and presents the content. In step 601, the client may connect to the DRM server, and may acquire the DRM license. This connection may be formed as a response to a user selection for a content asset and/or content version to be streamed, or may be initialized by the DRM server, content server and/or client device in preparation for future user selection of streaming content. For example, the client may proactively connect to the DRM server and obtain a license to protected content according to a fixed or predicted schedule in instances where content is consumed at regular intervals.

As discussed above, access to the decryption key may be gated such that client device 190 may need to process the usage restriction rules contained within the DRM license prior to accessing the decryption key. In step 603, the client device may wait for the play or playback command to be invoked. As the environment in which the content is to be consumed may change between acquiring the license and the commencing of consumption, processing the rules prior to playback (instead of, for example, upon acquiring the license) may make compliance with the terms of the license more likely. In steps 605, 606, and 607, the client device may process the usage restriction rules portion of the license, including the video resolution rules. If the restriction is unconditional, the restriction may be processed without further device capabilities and/or device state verification by advancing to step 607. If, however, a usage restriction rule is conditional, client requirements such as device capability or device state may be verified in step 606 prior to further processing in step 607. Device capability and/or device state verification in step 606 may include, for example, any one or more of a number of steps to determine or acquire information about the current device environment (e.g., attached or connected devices, device processing speed, network bandwidth and availability, available space on storage memories and/or media, the presence or absence of potential malicious software, hardware and/or firmware, and the like). Processing in step 607 may include, for example, any one of a number of steps to convert, manipulate, and/or alter data representative of the usage restriction rules to be utilized by the various components and/or subcomponents of the client device.

Each rule may be analyzed according to the ordering determined during the authoring of the DRM license. In step 609, additional restrictions may be determined and checked processed. In step 611, the media decryption key may be deciphered. The media decryption key may be used to access and decrypt the video content. One or more components and/or subcomponents may attempt to decipher the media decryption key. These one or more components may analyze the processed usage restrictions, such that compliance with the processed usage restriction rules is necessary to decipher the key. If the environment does not satisfy one or more usage restriction rules, an error may be raised and deciphering of the key may be halted. As an example, the one or more deciphering components and/or subcomponents may determine that a non-compatible external display monitor is attached to the client device, in potential violation of a conditional usage restriction rule. The one or more deciphering components and/or subcomponents may flag the key and/or usage restriction rule for further review by a subsequent processing component, and/or notify a local or remote component and/or subcomponent of a potential circumvention of one or more usage restrictions or an error regarding the same. For example, a notification may be presented on the external display monitor suggesting the monitor be disconnected before playback is reattempted.

In step 613, the content may be acquired, if it has not been previously acquired (e.g., downloaded, delivered). As discussed above, in an adaptive streaming environment, content may not necessarily be stored in a single location or file but rather segmented into multiple locations or files, information about which is stored in a manifest file. Furthermore, where multiple versions differing in resolution exist, information about the locations or files of the content segments alike in depicted content but different in resolution may also be stored in the manifest file. As discussed above, in some adaptive bitrate environments, a content heuristics engine (such as the content heuristics engine 253) may be used to optimize content version selection and/or segment selection. When a high amount of bandwidth is available, the content heuristics engine may select a higher-definition segment of the content. However, if network latency develops, the ability of the content server to deliver a higher-definition segment may be impacted. Therefore the content heuristics engine attempts to select a lower-definition segment.

In some embodiments, one or more processed usage restriction rules may be incorporated into the selection process of the content heuristics engine, such that the content heuristics engine may select only from among a subset of content versions and/or segments that will meet the criteria of the processed usage restriction rule. For example, the content heuristics engine may select a lower-bandwidth segment and/or content version, even if a high-bandwidth segment and/or content version may be present, and/or even if conditions may be favorable for the selection of such a higher-bandwidth segment and/or content version (e.g., processor availability, bandwidth criteria, and the like), because the resolution of the high-bandwidth segment and/or content version may be greater than the maximum resolution allowed by one or more processed usage restrictions. This may serve to limit or otherwise prevent downstream processing errors and/or discarding of a segment and/or content version unfit for display because the segment does not satisfy the one or more processed usage restrictions.

In step 615, the content may be prepared for display on a display device, as necessary. Some embodiments may include utilizing the processed usage restrictions at one or more components or subcomponents of the device at various stages of content preparation and/or processing. In some embodiments, one or more components and/or subcomponents that are configured to decrypt the delivered content (for example, using the deciphered media decryption key obtained in step 611) may incorporate analysis of the processed usage restriction rules prior to decrypting the content. The one or more decryption components and/or subcomponents may analyze one or more processed usage restrictions, such that compliance with the processed usage restriction rules may be necessary to decrypt the content. If the content does not satisfy one or more usage restriction rules, an error may be raised and decryption and/or display of the content may be halted. As an example, the one or more decrypting components and/or subcomponents may determine that the size of the content version and/or segment does not fall within a range of expected size values for a content version and/or segment that would be compatible with one or more processed usage restrictions. The decrypting components and/or subcomponents may reject (e.g., discard) the content version and/or segment, flag the content version and/or segment for further review by a subsequent processing component, and/or notify a local or remote component and/or subcomponent of a potential circumvention of one or more usage restrictions, or an error regarding the same. For example, a notification indicating the device was delivered an incompatible content version and/or segment may be recorded by the content provider. Subsequent notifications regarding the same device may trigger a review process of the device, users associated with the device, and/or the network used to deliver content to the device.

In some embodiments, components and/or subcomponents that comprise a content processing engine (e.g., content processing engine 254) may be coordinated to ensure compliance with the usage restrictions present in the DRM license. For example, if the content contains a video component, a content processing engine may be a video processing pipeline present in the client device. As discussed above, this engine may include noise reduction components, color space conversion components, frame rate conversion components, sampling/resampling components, video compression or decompression components, and the like. One or more of these components and/or subcomponents may analyze one or more processed usage restrictions, such that compliance with the processed usage restriction rules may be necessary to advance the image through the content processing engine. If the content does not satisfy one or more usage restriction rules, an error may be raised and further processing and/or display of the content may be halted. The processing components and/or subcomponents may reject (e.g., discard) the content version and/or segment, flag the content version and/or segment for further review by a subsequent processing component, and/or notify a local or remote component and/or subcomponent, including a networked component, of a potential circumvention of one or more usage restrictions.

Although the usage restriction rule may have been taken into account during step 613 during the selection of a content version and/or segment, some embodiments may utilize downstream processing of the usage restriction rule to deter user tampering with the content heuristics engine. For example, a user seeking to avoid compliance with the usage restriction rules and/or the DRM license may tamper with the content heuristics engine, either internally and/or externally, such as by tampering with the network traffic between the client device and the DRM server and/or content server. This tampering may result in high-definition content being delivered to the device, even though the content heuristics engine selected a lower-definition content version and/or segment. Downstream awareness and/or usage of the usage restriction rule may therefore be considered so as to block frames that are not compliant with the usage restriction rules.

Additionally or alternatively, the downstream processing components and/or subcomponents may be configurable so as to allow content non-compliant with one or more usage restriction rules to pass through the content processing engine, but convert the content to a format or version that may be compliant with the one or more usage restriction rules. For example, a content heuristics engine may select a high-definition version of a content that is incompatible with the current display environment, (e.g., the high-definition version of the content does not satisfy one or more usage restriction rules). This selection may be, for example, through an error in operation of the content heuristics engine, because the content heuristics engine is not configured to use the one or more usage restriction rules in its selection processing, as a result of user tampering, or the like. Instead of discarding the selected content, raising an error, and/or preventing the content from being displayed, one or more content processing components, such as a converter, may convert the high-definition version of the content to a lower-definition version of the content that is compatible with the current display environment (e.g., the lower-definition version of the content does satisfy the one or more usage restriction rule). The converted content may be further processed and displayed during step 615.

In step 617, the device may periodically reinitialize the usage restriction rule analysis to ensure that compliance with one or more usage restrictions present in the DRM license is ongoing. This subsequent analysis may detect a state change in the content consumption environment. For example, the user may connect their laptop computer to an external display monitor (such as external monitor 192) that is incompatible with the usage restriction rules in the DRM license. This state change may result in changes to what content versions and/or segments are available to the client device. This may result in selection and/or downstream processing changes, and the content heuristics engine and/or content pipeline (or components and/or subcomponents thereof) may be updated and/or notified so as to no longer select or process content from the now-incompatible content versions and/or segments.

One or more aspects of the disclosure may be embodied in computer-usable or readable data and/or executable instructions, such as in one or more program modules, executed by one or more processors or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium, as described above. As will be appreciated by one of skill in the art, the functionality of the program modules may be combined or distributed as desired in various illustrative embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of executable instructions and computer-usable data described herein.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps described above may be performed in other than the recited order, including concurrently, and that one or more steps may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method comprising:
   receiving, by a first computing device, digital rights management (DRM) data including connection type data associated with a content asset;
   selecting, from a plurality of versions of the content asset, by the first computing device, based on the connection type data, based on a first connection between the first computing device and a display device, and based on the received connection type data authorizing output of a first version of the content asset via the first connection, the first version of the content asset; and
   sending, by the first computing device and to a second computing device, a request for the first version of the content asset.

2. The method of claim 1, wherein the DRM data comprises a decryption key that is configured to decrypt each of a plurality of different versions of the content asset, and wherein the first computing device is configured, based on the connection type data, to process the decryption key after the first version of the content asset has been acquired by the first computing device.

3. The method of claim 1, wherein:
the first version of the content asset is formatted in a first resolution,
a second version of the content asset is formatted in a second resolution that is higher than the first resolution, and
the method further comprises: based on the connection type data and a second connection between the first computing device and the display device, prohibiting the first computing device from sending a second request for the second version of the content asset.

4. The method of claim 1, wherein the first version of the content asset is formatted in a first resolution, and a second version of the content asset is formatted in a second resolution that is higher than the first resolution, the method further comprising:
based on the connection type data and a bandwidth associated with a network, receiving, by the first computing device, at least a portion of the second version of the content asset;
receiving, by the first computing device, an indication that a playback command has been invoked for the second version;
determining, by the first computing device, that a connection between the first computing device and the display device has changed to a second connection; and
preventing, based on the connection type data and the second connection, output of the second version of the content asset to the display device.

5. The method of claim 1, further comprising:
receiving, by the first computing device, a second request for a second version of the content asset; and
sending an indication that the second request is denied based on the connection type data indicating that the second version of the content asset is associated with a connection type different from the first connection type.

6. The method of claim 1, wherein the first computing device is prohibited, based on the connection type data and a second connection between the first computing device and the display device, from sending a second request for a second version of the content asset.

7. A system comprising:
a first computing device and a second computing device;
wherein the first computing device comprises:
one or more first processors; and
first memory storing first instructions that, when executed by the one or more first processors, cause the first computing device to:
receive, from the second computing device, digital rights management (DRM) data including connection type data, wherein the first computing device is configured to restrict output of a content asset to one more versions of a plurality of versions of the content asset based on:
the connection type data; and
a connection between a device and an associated display;
select from the plurality of versions of the content asset, based on the connection and the received connection type data, a first version of the plurality of versions of the content asset;
send, to the second computing device, a request associated with the content asset, wherein the request is for the first version;
receive, from the second computing device, at least a portion of the first version of the content asset; and
send, to a first display via a first connection between the first computing device and the first display, at least the portion of the first version of the content asset, and
wherein the second computing device comprises:
one or more second processors; and
second memory storing second instructions that, when executed by the one or more second processors, cause the second computing device to:
send, to the first computing device, the DRM data including the connection type data;
receive, from the first computing device, the request; and
send, to the first computing device, the at least the portion of the first version of the content asset.

8. The system of claim 7, wherein:
the first version of the content asset is formatted in a first resolution,
a second version of the content asset is formatted in a second resolution that is higher than the first resolution,
the second version of the content asset is of the plurality of versions of the content asset, and
the first instructions, when executed by the one or more first processors, cause the first computing device to prohibit, based on the connection type data and the connection, sending a second request for the second version of the content asset.

9. The system of claim 7, wherein the first instructions, when executed by the one or more first processors cause the first computing device to restrict output of the content asset to one more versions of a plurality of versions of the content asset based on whether a connection between the first computing device and the first display is associated with the first display being configured to use a content protection scheme, and
wherein the first instructions, when executed by the one or more first processors, cause the first computing device to determine, based on the connection, that the first computing device is able to send the request for the first version of the plurality of versions of the content asset based on an indication that the connection is associated with the first display being configured to use the content protection scheme.

10. The method of claim 1, wherein the DRM data comprises a decryption key that is configured to decrypt each of a plurality of different versions of the content asset, wherein the first computing device is configured to acquire the content asset prior to processing of the decryption key by the first computing device, and wherein the method further comprises:
after determining that the first computing device is able to access a different version of the content asset, processing, by the first computing device, the decryption key; and
decrypting, by the first computing device and based on the decryption key, at least a portion of the different version of the content asset.

11. The method of claim 1, further comprising:
based on a bandwidth associated with a network, selecting for receipt, by the first computing device and from a second computing device via the network, at least a portion of a second version of the content asset.

12. The method of claim 1, wherein the first computing device restricts output of the content asset to one or more versions of a plurality of versions of the content asset based on whether a first connection between the first computing device and the display device is associated with the display device being configured to use a content protection scheme; and the method further comprising:

determining that the first computing device is able to access a different version of the content asset based on an indication that the display device, coupled to the first computing device via the first connection, is associated with the display device being configured to use the content protection scheme.

13. The method of claim 1, wherein the first computing device restricts output of the content asset to one or more versions of a plurality of versions of the content asset based on whether a first connection between the first computing device and the display device is associated with the display device being configured to use a content protection scheme, wherein the content protection scheme comprises High-Bandwidth Digital Content Protection (HDCP).

14. The method of claim 1, wherein the first computing device comprises a mobile device, and wherein the display device is different from the mobile device.

15. The method of claim 1, further comprising:
receiving, by the first computing device, at least a portion of a second version of the content asset; and
based on the connection type data:
selecting at least the portion of the second version of the content asset; and
outputting, for display, the portion of the second version of the content asset.

16. The method of claim 1, wherein:
the first version of the content asset is formatted in a first resolution; and
a second version of the content asset is formatted in a second resolution that is higher than the first resolution, and the method further comprising:
generating a first indication that the first computing device is configured to output content data to an external display;
sending, by the first computing device and to the external display, based on the connection type data, at least a portion of the first version of the content asset instead of the second version of the content asset; and
determining, based on the first indication, that the first computing device is able to access the first version of the content asset.

17. The method of claim 1, wherein:
the first version of the content asset is formatted in a first resolution; and
a second version of the content asset is formatted in a second resolution that is higher than the first resolution, and the method further comprising:
generating a second indication that the first computing device is configured to output content data; and
based on the second indication, receiving, by the first computing device, at least a portion of the second version of the content asset.

18. The method of claim 1, wherein the connection type data further indicates at least one unauthorized connection type for another version of the content asset.

19. The method of claim 1, further comprising:
detecting the first computing device being connected to a second display device;
determining a second connection between the first computing device and the second display device; and
preventing, based on the second connection and the connection type data, output of at least a portion of the first version of the content asset.

20. The method of claim 1, wherein the connection type data indicate one or more connection type restrictions associated with the content asset.

* * * * *

UNITED STATES PATENT AND TRADEMARK OFFICE
CERTIFICATE OF CORRECTION

| | |
|---|---|
| PATENT NO. | : 11,853,402 B2 |
| APPLICATION NO. | : 14/491393 |
| DATED | : December 26, 2023 |
| INVENTOR(S) | : Park et al. |

It is certified that error appears in the above-identified patent and that said Letters Patent is hereby corrected as shown below:

In the Specification

Column 4, Line 67:
Delete "180" and insert --141--

Column 6, Line 60:
Delete "260." and insert --256.--

Signed and Sealed this
Twenty-sixth Day of November, 2024

*Katherine Kelly Vidal*

Katherine Kelly Vidal
*Director of the United States Patent and Trademark Office*